(12) United States Patent
Cherukumudi et al.

(10) Patent No.: US 7,644,270 B1
(45) Date of Patent: Jan. 5, 2010

(54) WEB SERVICES SECURITY ARCHITECTURE

(75) Inventors: Vijaykumar Cherukumudi, Overland Park, KS (US); David Fultz, Raymore, MO (US); Shrikant Jannu, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 666 days.

(21) Appl. No.: 10/842,400

(22) Filed: May 10, 2004

(51) Int. Cl.
*H04L 29/06* (2006.01)

(52) U.S. Cl. ............. 713/156; 713/152; 713/181; 713/176; 726/30; 707/1; 707/2; 707/3; 707/4; 707/5; 707/6; 707/100; 707/101; 707/102; 709/206; 709/223

(58) Field of Classification Search ............ 713/181, 713/156, 152, 176, 81; 709/223, 206; 726/30; 707/1–6, 100–102
See application file for complete search history.

(56) References Cited

U.S. PATENT DOCUMENTS

| | | | |
|---|---|---|---|
| 6,611,869 | B1 | 8/2003 | Eschelbeck et al. |
| 7,219,134 | B2 * | 5/2007 | Takeshima et al. .......... 709/217 |
| 7,424,608 | B1 | 9/2008 | Cherukumudi et al. |
| 2003/0023880 | A1 * | 1/2003 | Edwards et al. ............. 713/201 |
| 2005/0044197 | A1 * | 2/2005 | Lai ............................. 709/223 |
| 2005/0182941 | A1 * | 8/2005 | Della-Libera et al. ....... 713/181 |
| 2005/0198154 | A1 * | 9/2005 | Xie et al. .................... 709/206 |

OTHER PUBLICATIONS

OASIS. "Web Services Security: SOAP Message Security 1.0." OASIS Open: Mar. 2004. pp. 1-56. http://docs.oasis-open.org/wss/2004/01/oasis-200401-wss-soap-message-security-1.0.pdf.*
IBM and Microsoft. "Security in a Web Services World: A proposed Architecture and Roadmap." Apr. 7, 2002. pp. 1-25. http://www.verisign.com/wss/architectureRoadmap.pdf.*
Microsoft. "Web Security Policy Language." Dec. 18, 2002. pp. 1-19. http://www.verisign.com/wss/WS-SecurityPolicy.pdf.*
Cherukumudi, Vijaykumar, et al., "Mechanism for Layered Authentication", U.S. Appl. No. 10/043,083, filed Sep. 16, 2004.

* cited by examiner

*Primary Examiner*—Christopher J Brown
*Assistant Examiner*—Kari L Schmidt

(57) ABSTRACT

A system to validate a request for web services which includes a digital certificate is provided. The system includes a first certification authority that provides a public encryption key and a certificate revocation list in response to requests. The system also includes a certification revocation list component that determines whether a digital certificate is named in the certification revocation list, a certificate verification component that determines whether a digital certificate is valid, a plurality of verifier components that determine the validity of a request for web services and each of which operates in accordance with a different one of a plurality of OASIS Web Services Security versions. The system also includes a management component to determine the version of the OASIS Web Service Security version of the web services request and to select an appropriate verifier component.

25 Claims, 4 Drawing Sheets

WEB SERVICES SECURITY ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software for communications, and more particularly, but not by way of limitation, to a system and method for providing secure web services access.

BACKGROUND OF THE INVENTION

As more and more business transactions are conducted electronically, for example using the Internet, techniques for securing this electronic commerce are sought. Some of the security concerns related to electronic commerce are confidentiality of communications, authentication of the communicating entities, and non-repudiation. Confidentiality of communications prevents the disclosure of the content of communication to third parties. Authentication assures that entities are who or what they claim to be. Non-repudiation assures that a client who has requested and received goods and/or services does not later deny requesting and/or receiving the goods and/or services.

Public key infrastructure (PKI) may be used to encrypt a message using a specific encryption algorithm along with a first encryption key and later decrypting the message using the same encryption algorithm with a second encryption key. More particularly, the first encryption key is a private key which is not shared with any parties, and the second encryption key is a public key which is shared with the party to whom the encrypted message is directed. The public and private key are a related pair of numbers or pair of data strings which are chosen so that the following encryption equation is satisfied: Message=PublicKey[PrivateKey(Message)]. The public and private key may be referred to as a public-private encryption key pair. This equation indicates that encrypting the message using the encryption algorithm and the private key and then encrypting this result using the encryption algorithm and the public key results in the original message. It is the nature of the public and private keys that the private key cannot be readily derived from knowledge of the public key. Software applications or programs are available for selecting public and private key pairs. The terms encryption and encryption key as used herein may refer to any of a variety of methods, such as for example private key only encryption and public-private key encryption schemes, for securing messages using techniques presently known or hereafter developed to keep all or some of the message content private.

A digital signature is a block of data created by encrypting using the public key. For example, the digital signature may be created by encrypting a message using the encryption algorithm and the public key. This signature may then be appended to the end of the message and the message plus signature encrypted and sent to the receiver. The receiver decrypts the message plus signature using the same encryption algorithm and the public key, obtaining the message and the signature. The receiver then decrypts the signature using the same encryption algorithm and the public key to obtain a copy of the message. If the message and the copy of the message match, everything is in order. This operation can be represented by the following encryption equations:

Sa=Pva(M): form the digital signature Sa by encrypting the message M with the private key Pva of party A Ta=Pva(M,Sa): form the transmission Ta by encrypting the concatenation of the message M with the digital signature Sa using the private key Pva of party A M, Sa=Pba[Ta]=Pba[Pva(M,Sa)]: decrypt the transmission Ta sent by party A by encrypting the transmission Ta with the public key Pba of party A to obtain the message M and the digital signature Sa.

M=Pba(Sa): decrypt the digital signature Sa with the public key Pba of party A. If the equality does not hold, then the transmission Ta was tampered with and may be untrustworthy.

This example shows one way in which a digital signature may be created. Other methods of creating a digital signature may be used. For example, a digest of a fixed length may be calculated over an entire message and this digest may be substituted in the place of the message M in the encryption equations above. The use of a digest may provide the needed indication of message integrity, i.e., freedom from tampering, without doubling the length of the message. For longer messages this efficiency may be desirable. The digital signature is unforgeable in that the private key is required to produce the digital signature and the private key is unknown to others.

A digital certificate provides a secure means for providing an entity's public key. Digital certificates rely on trusted certification authorities (CAs) which receive requests for and issue digital certificates. CAs are trusted because they are bound by legal agreements to create only valid and reliable digital certificates. An X.509 digital certificate includes a version identifier which identifies which version of the X.509 digital certificate standard was employed in creating the digital certificate, and a serial number uniquely identifying the digital certificate within the issuing CA. The certificate also includes a signature algorithm identifier identifying the signature algorithm used by the CA to sign the digital certificate, an issuer name identifying the CA which signed the digital certificate, and a validity period defining for what time period the digital certificate is valid. The certificate also includes a subject name of the entity whose public key is contained in the certificate, a subject public key information identifying the encryption algorithm and the public key of the entity to whom the digital certificate is issued, and the digital signature of the issuing CA. The digital signature of the issuing CA is calculated over the rest of the digital certificate using the public key of the CA. The digital certificate is created by the issuing CA when a qualified requestor requests the digital certificate and provides the necessary information. The CA may retain a list of digital certificates, termed a certificate revocation list (CRL), that it earlier issued but has since revoked.

The Organization for Advancement of Structured Information Standards (OASIS) Web Services Security: SOAP Message Security specification describes enhancements to simple object access protocol (SOAP) messaging to provide for message integrity and confidentiality. This specification is widely supported in various official versions and draft versions by vendors of third party applications which access web services.

SUMMARY OF THE INVENTION

A system to validate a request for web services which includes a digital certificate is provided. The system includes a first certification authority that provides a public key and a certificate revocation list in response to requests. The system also includes a certification revocation list component that determines whether a digital certificate is named in the certification revocation list, a certificate verification component that determines whether a digital certificate is valid, a plurality of verifier components that determine the validity of a request for web services and each of which operates in accordance with a different one of a plurality of OASIS Web Services Security versions. The system also includes a management component to determine the OASIS Web Service Security version of the web services request and to select an appropriate verifier component.

A system to provide secure access to a web server is provided. The system includes a certification authority to provide a key and a certificate revocation list, a security component that communicates with the certification authority and approves access to a web service. The security component receives requests to approve access formatted according to a version of the Organization for Advancement of Structured Information Standards Web Services Security standard and returns responses formatted according to the same version of the Organization for Advancement of Structured Information Standards Web Services Security standard. The system also includes a web server that provides the web service, and a gateway that receives a request for web service, approves the request for web service through communication with the security component, sends the request for web service to the web server, and returns the response received from the web service.

A method to provide secure access to a web service is provided. The method includes requesting a digital certificate, providing the digital certificate, and requesting the web service in a message. The message includes the digital certificate and is formatted according to one of a plurality of versions of the Organization for Advancement of Structured Information Standards Web Services Security: Simple Object Access Protocol Message Security standard. The method also provides for validating the digital certificate, verifying the integrity of the message, and providing the web service.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

While there is wide vendor support for the OASIS Web Services Security: SOAP Message Security specification, hereinafter referred to as the WSS specification, the various vendors may support different incompatible draft and official versions of the specification. To interoperate with multiple vendors, as well as to efficiently adapt to future upgrades and extensions of the WSS specification, what is needed is a system and method of flexibly interoperating with different draft, official, or other versions of the WSS specification.

Figure 1:
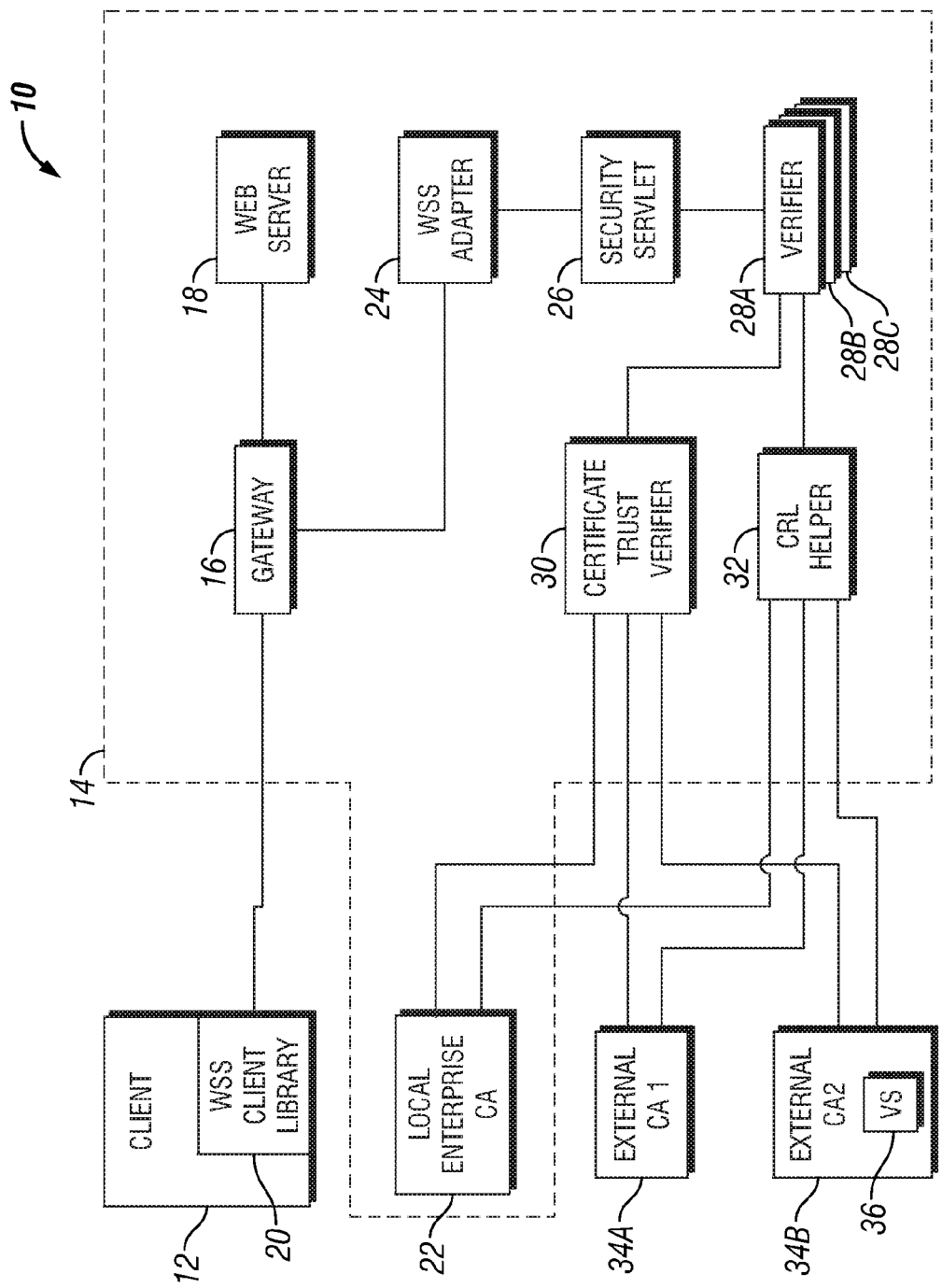
FIG. 1 is a block diagram of a system for providing a secure web services architecture.

Turning now to FIG. 1, a block diagram of a system 10 for providing web services security is depicted. A client 12 is in communication with a web services provider 14 to request and receive responses from web services. The client 12 communicates directly with a gateway 16 which first validates the request for web services of the client 12 and then forwards the request to a web server 18. The client 12 bases at least a part of the content of the request for web services on a Web Services Description Language (WSDL) message that defines the interface to the web service provider, i.e., the web server 18. WSDL is an extensible markup language (XML) for describing web services and how to access them. The WSDL message may be statically configured in the client 12, or the client 12 may dynamically request the WSDL message from an appropriate naming service. In some cases, the client 12 may not be able to interface properly to the web services provider 14. In these cases, a web services security client library 20 may be linked into the application of the client 12 to support interfacing to the web services provider 14.

The client 12 may communicate with a local certification authority (CA) 22 located within the web services provider 14 to obtain a digital certificate. Alternately, the client 12 may communicate with a third party CA 34 to obtain the digital certificate. The client 12 generates a private key of the client 12 and a public key of the client 12. The request of the client 12 for the digital certificate includes the public key of the client 12 and a name of the client 12. The local CA 22 creates the digital certificate, signs it with a digital signature of the local CA 22, and sends the digital certificate to the client 12.

The client 12 digitally signs the outgoing SOAP message request for web services and sends the signed request, along with the digital certificate, to the web services provider 14. The client 12 signs the content of the SOAP message and embeds the digital certificate using the signing libraries compliant with the WSS specification and using the private key of client 12. The gateway 16 receives the SOAP message request and forwards a copy of the SOAP message request to an adapter component 24. The adapter component 24 is in communication with a security servlet 26. In a preferred embodiment, the adapter component 24 communicates with the security servlet 26 using hypertext markup language transport protocol (HTTP). The adapter component 24 sends the copy of the SOAP message request to the security servlet 26 to be validated. This validation determines if the SOAP message request has been tampered with, if the conditions for non-repudiation of the request for web services are satisfied, if the digital certificate is deemed trusted by the local CA 22, if the digital certificate is in a non-expired state, and if the digital certificate is in a non-revoked state.

The security servlet 26 reads the SOAP message request header to determine which WSS specification version, such as but not limited to draft or official versions, was used to create the SOAP message request and invokes one of a plurality of verifier components 28—a first verifier component 28a, a second verifier component 28b, and a third verifier component 28c are shown in FIG. 1. The verifier component 28 is selected based on the WSS specification version identified in the SOAP message request header. The security servlet 26 passes the copy of the SOAP message request to the verifier component 28 which will validate the SOAP message request. This selective invocation of one of the verifier components 28 supports the needed interoperability with different versions of the WSS specification. The web services provider 14 need only deploy an additional version specific verifier component 28 to interwork with clients 12 in accordance with a future new WSS specification.

The verifier component 28 is in communication with a certificate trust verifier 30 which is requested to confirm that the digital certificate is trusted. This confirmation entails verifying the digital signature of the local CA 22 using the public key of the local CA 22 which should match either the information content of the digital certificate or match a digest of the digital certificate, depending on how the digital signature of the local CA 22 was created.

The verifier component 28 is in communication with a certificate revocation list (CRL) helper component 32. The verifier component 28 requests the CRL helper component 32 to check if the digital certificate provided by the client 12 in the SOAP message is revoked. The CRL helper component 32 may communicate with the local CA 22 to obtain the revocation list of the local CA 22 for every verification action. In some embodiments, the CRL helper component 32 may store the revocation list of the local CA 22 to local memory on a periodic basis and refer to this locally stored or cached version of the revocation list when performing revocation checks.

The verifier component 28 examines the digital certificate provided by the client 12 in the SOAP message header to determine if the digital certificate has expired.

The verifier component 28 verifies the digital signature of the client 12 using the public key of the client 12. The verifier component 28 may obtain the public key of the client 12 from the digital certificate which the client 12 embedded in the SOAP message header. Note that the conditions for non-repudiation—that is, the client 12 cannot claim that it did not send the SOAP message request to the web services provider 14—are satisfied if the digital signature provided by the client 12 in the SOAP message request is shown to be valid.

If all of the above checks succeed—the digital signature provided by the client 12 is valid, the digital certificate is trusted, the digital certificate is not revoked, and the digital certificate is not expired—then the signature verification component 28 returns a message to the security servlet 26 indicating that the SOAP message request passed these security checks. The security servlet 26 returns a message to the adapter component 24 indicating that the SOAP message request passed these security checks. The adapter component 24 returns a message to the gateway 16 indicating that the SOAP message request passed these security checks. The gateway 16 forwards the request for web service to the web server 18. The web server 18 provides the requested service. The gateway 16 returns the result of the requested service to the client 12, completing the web service request cycle.

The gateway 16, the web server 18, the web services security client library 20, the local CA 22, the adapter component 24, the security servlet 26, the verifier component 28, the certificate trust verifier 30, the CRL helper component 32, the external CA 34, and the verification server 36 are software components or applications which may execute on any general purpose computer. General purpose computers are discussed in greater detail hereinafter.

In some embodiments, the local CA 22 may include a verification server. In this case, the verifier component 28 may request the verification server to perform all digital certificate checks including verification of the digital signature of the local CA 22 and hence the trust of the digital certificate, the revocation status of the digital certificate, and the expiration status of the digital certificate. The verifier component 28, in this case, would still verify the digital signature of the client 12 located in the SOAP message request.

In some embodiments the digital certificate in the SOAP message request may be provided by an external CA 34a or 34b. The external CA 34a is depicted to have no verification server. The external CA 34b is depicted as having a verification server 36. In this case the client 12 may request the digital certificate directly from the external CA 34 rather than from the internal CA 22.

Figure 2:
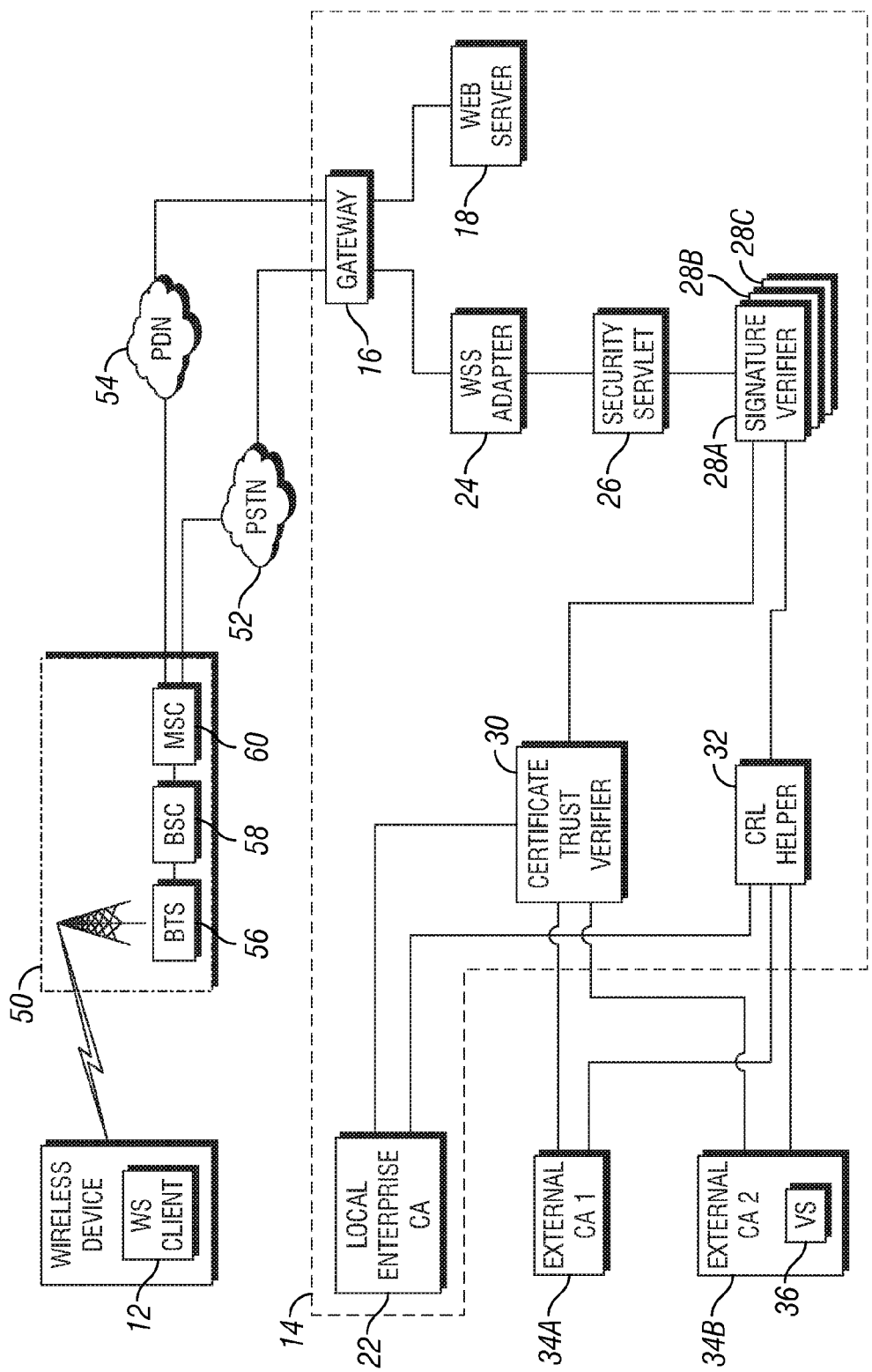
FIG. 2 is a block diagram of the system for providing a secure web services architecture in an exemplary use.

Turning now to FIG. 2, a block diagram illustrates a practical use of the web services provider 14. In this exemplary usage, the client 12 communicates with the web services provider 14 through a wireless network 50 bridged to the web services provider 14 by a public switched telephone network (PSTN) 52 or a packet data network (PDN) 54. The client 12 may be, for example, a laptop computer with an 802.11 compliant wireless interface, a mobile telephone, or some other mobile device, or some fixed wireless device. The client 12 may be employed to activate a cell phone purchased at a retail store not directly associated with the cell phone vendor and hence outside the cell phone vendor's enterprise network. The web services provider 14 is contained within the cell phone vendor's enterprise network, and the web service provided by the web server 18 to the client 12, in this example, is provisioning mobile phone service in the appropriate databases of cell phone vendor's enterprise.

The wireless network 50 may comprise a transceiver in wireless radio communication with the client 12, a bridge node linking to the PSTN 52 or linking to the PDN 54, such that the transceiver is in communication with the bridge node. In one embodiment, a base transceiver station (BTS) 56 is in radio communication with the client 12, a mobile switching center (MSC) 60 bridges the wireless network 124 to the PSTN 52 and/or the PDN 54, and a base station controller (BSC) 58 links the BTS 56 to the MSC 60. In another embodiment, for example in a General Packet Radio Service (GPRS) infrastructure, a Gateway GPRS Service Node (GGSN) or a Serving GPRS Service Node (SGSN) may perform the role of the bridge node linking the wireless network 50 to the PDN 54.

Figure 3:
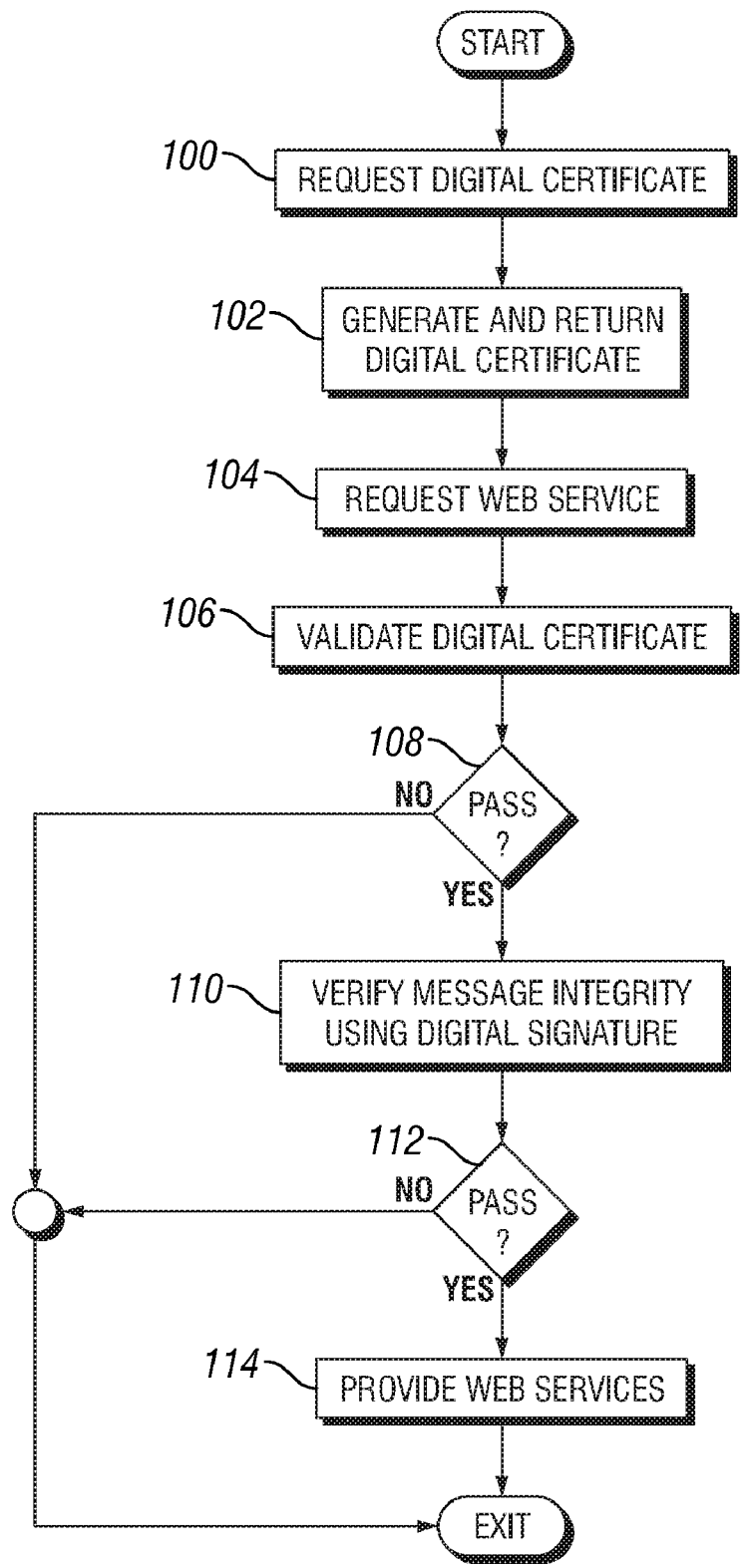
FIG. 3 is a flow chart of a method for using the secure web services architecture.

Turning now to FIG. 3, a flow chart depicts a method for securely accessing web services. At block 100 the client 12 requests the digital certificate from the local CA 22 or the external CA 34. The client 12 generates the public and the private keys of the client 12. The client 12 provides the public key of the client 12 in the request for the digital certificate. The method proceeds to block 102 where the local CA 22 or the external CA 34 generates the digital certificate and returns it to the client 12. Generating the digital certificate includes providing the public key of the client 12 and the digital signature of the local CA 22 or the external CA 34, as appropriate, calculated over the digital certificate.

Proceeding to block 104, the client 12 sends a SOAP message requesting web service to the web service provider 14. This SOAP message includes the digital certificate created by the local CA 22 or the external CA 34 at block 102 as well as the digital signature of the client 12 calculated over the SOAP message using the private key of the client 12.

Proceeding to block 106, the web service provider 14 receives the SOAP message requesting web service. The SOAP message header is examined to determine the WSS version according to which it was created and validates the digital certificate according to the appropriate WSS version. Validation includes checking that the digital certificate is trusted, that the digital certificate is not revoked, and that the digital certificate has not expired. Two different SOAP message requests generated according to different WSS versions are discriminated in this method block 106 and acted upon differently. As described above in reference to FIG. 1, this differentiation is accomplished by the security servlet 26 detecting the different version in the SOAP message header and invoking different verifier components 28 depending upon what WSS version is indicated.

Proceeding to block 108, if the above validation succeeded the method proceeds to block 110 where the non-repudiation status and integrity of the SOAP message requesting web service is verified using the public key of the client 12. Verifying the integrity of the SOAP message requesting web service intrinsically assures the non-repudiation status.

Proceeding to block 112, if the above verification succeeded the method proceeds to block 114 where the requested web services are invoked and the results are returned to the client 12. The method then exits. If the validation fails at block 108 or if the verification fails at block 112, the method exits.

In some embodiments a check may be made following block 112 to determine if the client 12 is authorized to access the specific requested web service. This feature may be referred to as service request authorization.

Figure 4:
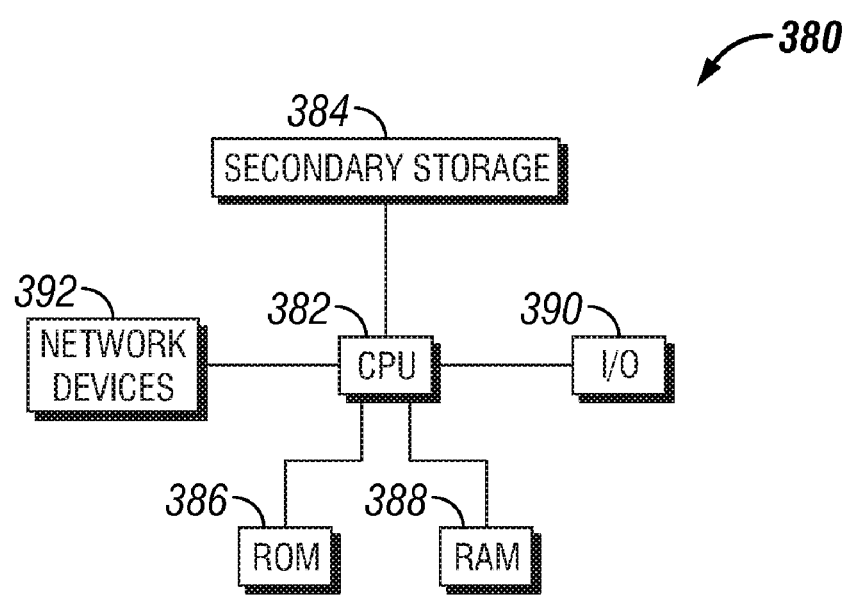
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system to validate a request for web services, the request including a digital certificate, comprising:
a first certification authority that returns a public key in response to a request, the public key associated with the first certification authority, and returns a certificate revocation list in response to a request for the certificate revocation list, the certificate revocation list enumerating digital certificates issued by the certification authority which are revoked;
a certificate revocation list component that receives the certificate revocation list from the first certification authority and determines whether a digital certificate is named in the certificate revocation list;
a certificate verification component that requests the public key from the first certification authority and determines whether the digital certificate is valid;
a plurality of verifier components each stored on a computer readable storage medium and executable by a processor, each of which communicates regarding the validity of the digital certificate and returns a determination of acceptance of the request for web services, each verifier component designed to operate in accordance with a different one of a plurality of different incompatible simple object access protocol message security versions, wherein at least one of the verifier components obtains a determination of digital certificate revocation from the certificate revocation list component; and a management component stored on a computer readable storage medium and executable by a processor, the management component determines a simple object access protocol message security version of the request for web services, selects one of the plurality of verifier components to provide the determination of acceptance of the request for web services based on the simple object access protocol message security version of the web services request and returns the determination of acceptance of the request for web services.

2. The system of claim 1 further including a second certification authority that verifies a digital certificate.

3. The system of claim 1 wherein at least one of the verifier components determines acceptance of the request for web services.

4. The system of claim 1 wherein at least one of the verifier components receives a determination of digital certificate validity from the certificate trust verification component, examines the digital certificate, and determines if the digital certificate is expired.

5. The system of claim 1 wherein the public key is defined as a first public key.

6. The system of claim 1 wherein the management component receives the request for web services in a hypertext markup language transport protocol message.

7. The system of claim 1 wherein the certificate verification component stores the public key and eliminates the request for the public key from the certification authority.

8. The system of claim 1 wherein the certificate revocation list component periodically requests, receives, and stores the certificate revocation list from the certification authority, to eliminate the need to request the certificate revocation list for each request to determine whether the digital certificate is named in the certificate revocation list.

9. A system to provide secure access to a web server, comprising:

a certification authority that provides an encryption key associated with the certification authority and provides a certificate revocation list, the certificate revocation list listing revoked digital certificates issued by the certification authority;

a security component stored on a computer readable storage medium and executable by a processor, in communication with the certification authority, that receives a plurality of requests to approve access to at least one web service and the security component uses the certificate revocation list to approve access to the at least one web service, wherein some of the plurality of requests are formatted according to a different one of a plurality of different incompatible versions of a simple object access protocol message security standard, and provides a response to the plurality of requests to approve access to the at least one web service formatted according to a corresponding one of the plurality of different incompatible versions of the simple object access protocol message security standard, wherein the security component checks whether a corresponding digital certificate is revoked;

at least one web server that provides the at least one web service; and a gateway that, in response to receiving the plurality of requests for the at least one web service, approves the plurality of requests for the at least one web service through communication with the security component, sends the plurality of requests for the at least one web service to the at least one web server, and returns the at least one web service.

10. The system of claim 9 wherein the encryption key is a public encryption key of a public-private encryption key pair used in a public key infrastructure.

11. The system of claim 9 wherein the certificate revocation list enumerates digital certificates issued by the certification authority which are revoked.

12. The system of claim 9 wherein the security component validates the corresponding digital certificate contained in the plurality of requests for the at least one web service, the validation including to check if the corresponding digital certificate is expired, and to check the integrity of the plurality of requests for the at least one web service.

13. The system of claim 12 wherein the certification authority provides a verification service for the corresponding digital certificate including information about a trust of the corresponding digital certificate, a revocation status of the corresponding digital certificate, and an expiration status of the corresponding digital certificate, and wherein the security component requests the verification service for the corresponding digital certificate from the certification authority and approves access to the at least one web service based on the verification service for information provided.

14. The system of claim 9 wherein the request for the at least one web service is in accordance with the simple object access protocol message security standard.

15. The system of claim 9 wherein the communication with the security component includes the plurality of requests to approve access to the at least one web service and a corresponding response to each of the plurality of requests to approve access to the at least one web service and wherein the communication with the security component is hypertext markup language transport protocol messages.

16. The system of claim 9 further including a client device in communication with the gateway and the certification authority, the client device including an application linked with a software library associated with the gateway, the software library providing methods to acquire the corresponding digital certificate, to generate a private key and a second public encryption key, wherein the private key and the second public encryption key are associated with the client device.

17. The system of claim 16 wherein the client device is a wireless device, and further including a wireless communication network, the wireless communication network including a wireless transceiver in radio communication with the client device and a bridge node linking the wireless communication network to one of a public switched telephone network and a packet data network, and wherein the gateway communicates with the client device via the wireless communication network and one of the public switched telephone network and the packet data network.

18. The system of claim 17 wherein the wireless transceiver is a base transceiver station, wherein the wireless communication network includes a base station controller in communication with the base transceiver station, and wherein the bridge node is a mobile switching center which is in communication with the base station controller.

19. The system of claim 17 wherein the wireless transceiver is a base transceiver station, wherein the wireless communication network includes a base station controller in communication with the base transceiver station, and wherein the bridge node is one of a gateway general packet radio service node and a serving general packet radio service node which is in communication with the base station controller.

20. The system of claim 17 wherein the at least one web service activates a mobile communication subscription.

21. A method to provide secure access to a web service, comprising:

provided a plurality of digital certificates in response to a plurality of requests for a plurality of digital certificates;

receiving a plurality of requests for the web service in a plurality of messages, wherein each of the plurality of messages include a corresponding one of the plurality of digital certificates and some of the plurality of messages are formatted according to a different one of a plurality of different incompatible versions of Simple Object Access Protocol Message Security standard;

identifying a corresponding requested version of the Simple Object Access Protocol Message Security standard for each of the plurality of messages;

validating each of the plurality of digital certificates with a corresponding one of a plurality of verifier components stored on a computer readable storage medium and executed by a processor, the validating including determining whether each of the plurality of digital certificates is named in a certificate revocation list that enumerates digital certificates issued by the certification authority which are revoked and verifying a non-revoked status of each of the plurality of digital certificates;

verifying the integrity of the plurality of messages; and providing the web service for each of the plurality of messages based on validating the corresponding one of the plurality of digital certificates.

22. The method of claim 21, wherein the digital certificate is a X.509 digital certificate.

23. The method of claim 21, wherein the validating each of the plurality of digital certificates is performed by a certification authority, the certification authority including a verification server that verifies a trust of each of the plurality of digital certificates, and verifies a non-expired status of each of the plurality of digital certificates.

24. The method of claim 21, further including requesting a public encryption key from a certification authority and employing the public encryption key in validating each of the plurality of digital certificates.

25. The method of claim 21, wherein receiving a plurality of requests for the web service in the plurality of messages is performed by an application and further including authorizing the application to use the web service.

* * * * *

UNITED STATES PATENT AND TRADEMARK OFFICE
CERTIFICATE OF CORRECTION

PATENT NO. : 7,644,270 B1  
APPLICATION NO. : 10/842400  
DATED : January 5, 2010  
INVENTOR(S) : Cherukumudi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1121 days.

Signed and Sealed this

Sixteenth Day of November, 2010

David J. Kappos  
*Director of the United States Patent and Trademark Office*